Oct. 6, 1970     R. G. WALLACE     3,532,839

SAFETY DEVICE FOR STALLED VEHICLES

Filed April 2, 1969

INVENTOR.
ROBERT G. WALLACE
BY
*Alexander B Blair*
ATTORNEY.

United States Patent Office 3,532,839
Patented Oct. 6, 1970

3,532,839
SAFETY DEVICE FOR STALLED VEHICLES
Robert G. Wallace, 9548 Gerber Road,
Sacramento, Calif. 95829
Filed Apr. 2, 1969, Ser. No. 812,705
Int. Cl. H01h 3/14
U.S. Cl. 200—61.89                                               4 Claims

ABSTRACT OF THE DISCLOSURE

When an automobile stalls in traffic, the operator by applying the foot brake closes a pair of normally open switches to simultaneously activate the brake warning lights of the automobile and to close the ignition engine starting circuit so that starting may occur while the transmission selector level is in the "drive" position, and it is unnecessary to move the selector level to the "park" or "neutral" position.

BACKGROUND OF THE INVENTION

The invention arises from a need which has existed for a considerable time for some means for dealing with the troublesome and frustrating problem which arises when an automobile engine stalls in traffic. When this occurs, the driver usually attempts to start the engine by turning the ignition key while the transmission selector lever is in the drive position. The ignition circuit remains open while the selector lever is at the drive position because this is a built-in safety feature of all automobiles to prevent the vehicle from lurching ahead upon starting as where the driver's foot might not be on the brake pedal at the time of restarting. As is well known, the driver must move the selector lever to neutral or to park in order to establish the ignition circuit and under the pressure of a stall situation in heavy traffic this can be very disturbing until the driver recovers his composure and realizes what must be done to restart the engine.

The invention, in a very simple way, solves this problem without sacrifice of safety and without adding any appreciable cost to the automobile or any change in its construction. A simple dual switch device is mounted for actuation by the foot brake arm so that, when the engine stalls in traffic while the selector lever is in the drive position, all that need be done is for the driver to place his foot on the brake pedal and turn the ignition key to restart the engine. This is the most natural thing to do and it is completely unnecessary to touch the transmission selector lever. The dual switch device upon application of the brakes will energize the rear brake lights to warn the driver behind, and simultaneously the ignition circuit will be conditioned so as to operate for starting the engine when the manual ignition switch is activated by turning the key. As is well known, modern automobiles for safety reasons require the closing of two switches in the ignition circuit as a precondition to start it. One switch is the ignition key-operated switch and the second switch is associated with the selector lever of the transmission. The second switch does not close until the lever is in the park position and on some makes of cars in the neutral or park position. The second switch, in this invention, takes the place of or overrides the second normally open switch associated with the selector lever.

Various additional features of the invention will be apparent during the course of the following description.

DESCRIPTION OF DRAWING FIGURES

DETAILED DESCRIPTION OF THE PREFERRED EMBODIMENT

Figure 1:
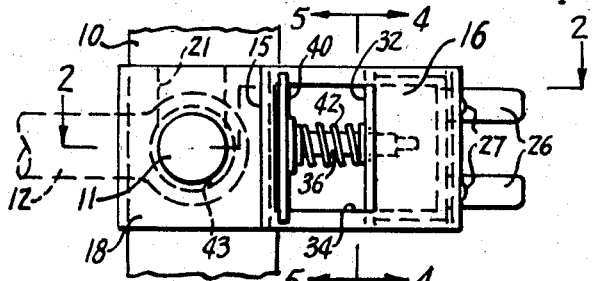
FIG. 1 is a side elevational view of a safety starting device for stalled vehicles embodying the invention.

Referring to the drawings in detail, wherein like numerals designate like parts, the numeral 10 indicates a fragmentary portion of the foot brake arm or lever in an automobile braking system, connected by a transverse pin 11 with a plunger eye bolt 12, connected with and operating the brake master cylinder piston means.

Figure 2:
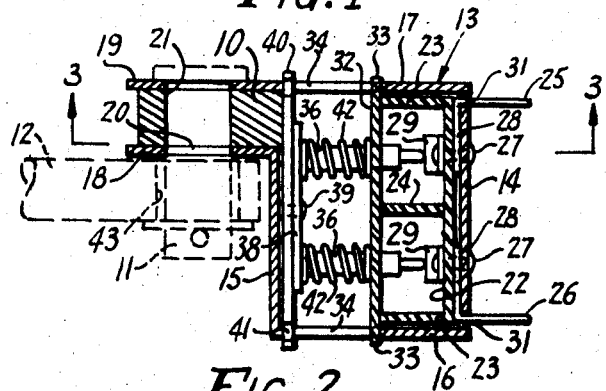
FIG. 2 is a horizontal section taken on line 2—2 of FIG. 1.

The invention proper is in the nature of an attachment to the arm 10 and comprises a main supporting bracket 13 having a forward wall 14, a rear wall 15 and side walls 16 and 17, all integrally connected and conveniently formed from sheet metal into a generally rectangular configuration, FIG. 2. A right angular extension 18 of rear wall 15 and an opposing extension 19 of side wall 17 project rearwardly in straddling relation to the brake arm 10 adjacent one side of the plunger eye bolt 12. The extension 18 has an opening 20 receiving the pin 11 and the extension 19 has a slot 21 also receiving the pin 11, said slot extending through the upper edge of extension 19, FIG. 1.

Disposed within the bracket 13 adjacent the forward wall 14 is a rectangular box-like body 22 having side and intermediate walls 23 and 24 projecting rearwardly for equal distances, the rear side of the body 22 being open. The body 22 near its opposite sides carries pairs of L-shaped electrical terminals or connectors 25 and 26 secured thereto by rivets 27 which also serve to secure the body 22 fixedly to the forward wall 14. The lateral arms 28 of terminals 25 and 26 are therefore sandwiched in between the body 22 and wall 14, as clearly shown in FIG. 2 and in FIG. 3.

Figure 3:
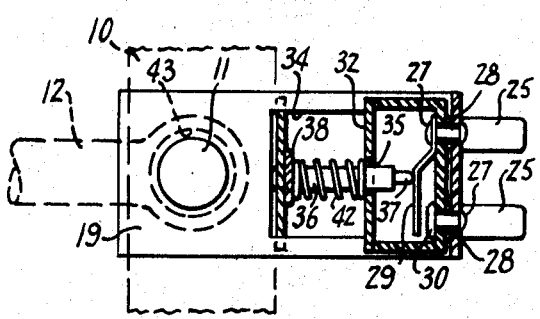
FIG. 3 is a similar section taken on line 3—3 of FIG. 2.

A single pair of leaf spring contacts 29 are mounted within the box-like body 22 in the two compartments thereof separated by the wall 24 and corresponding ends of these spring contacts are anchored to one pair of the rivets 27, as shown, the free end portions of the spring contacts extending over the interior heads 30 of the other pair of rivets and being normally spaced therefrom in the manner shown in FIG. 3. Consequently, the spring contacts 29 and contact pair of rivet heads 30 constitute normally open switches whose purpose and operation will be further described. The forward wall 14 of bracket 13 is provided close to the side walls 16 and 17 with slots 31 through which the longitudinal arms of the L-shaped contacts 25 and 26 project forwardly, as shown, for conventional attachment to wiring of the automobile electrical system. As will be further described one of the switches is in the electrical circuit through the rear end brake lights of the automobile and the other switch is in a circuit through the transmission selector system, in place of or overriding the usual switches at the neutral and park positions of the selector lever.

Figure 4:
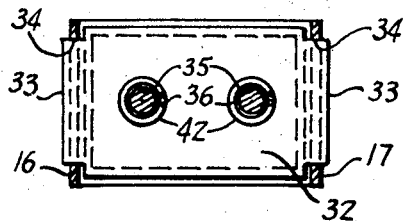
FIG. 4 is a vertical section taken on line 4—4 of FIG. 1.

The device further comprises a stop plate 32, FIG. 4, in opposing relation to the rear open side of body 22 and having opposite side extensions 33 engaging slidably through rectangular guide openings 34 in the bracket side walls 16 and 17. The stop plate 32 has spaced guide openings 35 for switch actuating plungers 36 having reduced tips 37 which engage the spring contacts 29, FIGS.

Figure 5:
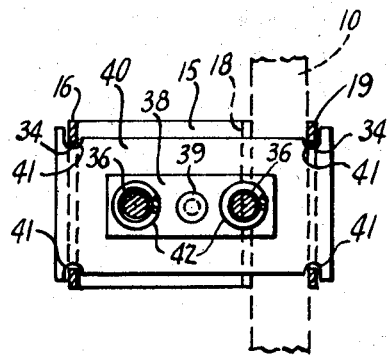
FIG. 5 is a similar section taken on line 5—5 of FIG. 1.

2 and 3. The plungers 36 are secured to a crosshead or plate 38 riveted centrally at 39 to a movable pressure plate 40 having notches 41, FIG. 5, near its corners sidably engaging the edges of guide openings 34, whereby the pressure plate may be shifted forwardly and readwardly toward and away from the stop plate 32, while remaining in parallel relation thereto. Compression springs 42 surround the plungers 36 between the crosshead 38 and the stop plate 32 and these springs maintain the plungers 36 in their normally retracted positions where the spring contacts 29 are separated from the associated rivet heads 30 and the two safety switches are normally open. At this time, the pressure plate 40 is at the rear ends of openings 34 which serve to limit the retraction of the plungers 36.

As shown best in FIG. 2, the brake arm 10 is in contact with the rear side of pressure plate 40 so that movement of the brake arm when the brakes are applied will shift the pressure plate forwardly slightly with the plungers 36 causing the latter to close the switch contacts 29 and 30. Only a slight movement of the pressure plate 40 is required to close the two switches and sufficient clearance indicated at 43 between the pin 11 and plunger eye bolt 12 is provided for this purpose. That is to say, when the brakes are applied by the driver, the initial movement of the arm 10 acting through pressure plate 40 will simultaneously close the contacts 29 and 30 of the two safety switches and further movement of the arm 10 will move the plunger eye bolt 12, causing the master cylinder of the braking system to apply the brakes. The entire bracket 13 and the parts carried thereby will move with the arm 10 but the two safety switches will remain closed until the foot is removed from the brake pedal due to the resistance to forward movement of the entire assembly by the wiring means, not shown, connected with the longitudinal arms of terminals 25 and 26. When the brake foot pedal is released, the springs 42 will immediately cause retraction of the plungers 36 and separation of the safety switch contacts 29 and 30.

Figure 6:
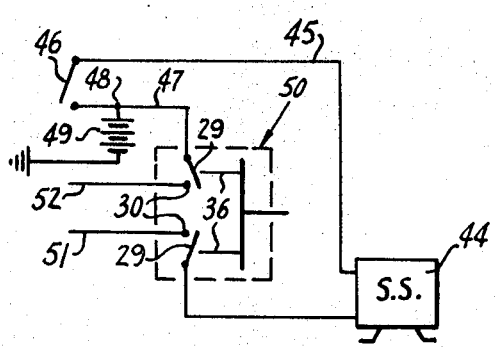
FIG. 6 is a wiring schematic showing a portion of an automobile ignition circuit and the dual switch means embodying the invention.

In connection with the operation of the invention, reference is made to FIG. 6 showing a portion of the vehicle ignition circuit, including the usual starter solenoid 44 connected by a wire 45, namely a ground wire, with one connect 46 of the key-operated ignition switch. The other contact of the ignition switch is connected with a hot wire 47 having a connection at 48 with the usual storage battery 49. Connected in the wire 47 between the ignition switch and starter solenoid is the invention unit shown generally at 50 in FIG. 6 and including the pair of simultaneously operable normally open switches comprised of contacts 29 and 30, as described. The plungers 36 are shown diagrammatically in FIG. 6. The contacts 30 in FIG. 6 are shown connected with wires 51 and 52 leading to the automobile brake lights and transmission selector lever control, respectively, and these wires 51 and 52 are the wires which attach to the longitudinal extensions of contacts or terminals 25 and 26 shown in FIGS. 2 and 3.

It may now be understood readily that when the vehicle engine stalls and the operator applies the foot brake, the arm 10 acting on pressure plate 40 will close two safety switches having contacts 29 and 30. Immediately, the rear brake lights are energized and the ignition switch circuit is conditioned so that the operator, by turning the ignition key and closing the ignition switch, will complete the circuit with the battery and starter solenoid and crank the engine through the usual starter mechanism, not shown. The brakes are also applied and when the engine is restarted there is no danger of lurching ahead even though the selector lever is in the drive position. As soon as the ignition key is released, the ignition switch 46 reopens automatically and when the brake foot pedal is released, the two safety switches will return to their normally open positions. It should now be apparent that the invention eliminates the troublesome necessity for moving the transmission selector lever to the neutral or park position before the stalled engine can be restarted and the invention accomplishes the desired result without loss of safety.

The invention is applicable to standard gear shifts and automobiles with standard shafts and without any protective means are subject to being started in gear as by children should the ignition key be left in the car. With the invention utilized on standard shift vehicles, the foot brake would have to be applied before one could complete the ignition circuit and start the engine.

What is claimed is:

1. A safety starting device for stalled vehicles comprising a supporting bracket attachable to a foot pedal brake arm of a vehicle, dual normally open pairs of electrical contacts on said bracket adapted for connection in the vehicle ignition circuit, and spring loaded plunger means on the bracket engaging said brake arm and moved by the brake arm when the vehicle brakes are applied to close said dual contacts, said plunger means including a pressure plate having guided engagement with said bracket and being in direct contact with said brake arm.

2. The structure of claim 1, wherein said dual contacts include a pair of spring contacts on said bracket and said plunger means comprises a separate plunger aligned with each spring contact, a crosshead element connecting said plungers as a unit, a stop plate on said bracket having a pair of openings receiving and guiding said plungers, said pressure plate arranged opposite the stop plate and having sliding guided engagement with the bracket and bearing against the crosshead element and also bearing against said brake arm, and a compression spring on each plunger between the crosshead element and stop plate.

3. The structure of claim 2, wherein said supporting bracket includes spaced side walls having opposing guide openings, and said stop plate and said pressure plate each having interlocking movable engagement within said guide openings and said pressure plate shiftable longitudinally of said plungers, said spring contacts being leaf springs extending transvesrely of the extremities of the plungers and contacting the latter.

4. The structure of claim 3, and electrical terminal carried by the supporting bracket and projecting forwardly thereof for connection with wire and being in electrical contact with terminal fixed to the supporting bracket and engageable with said spring contacts.

References Cited
UNITED STATES PATENTS 3,404,246  10/1968  Stimpson _____ 200—61.89

ROBERT K. SCHAEFER, Primary Examiner

M. GINSBURG, Assistant Examiner